US006366299B1

(12) United States Patent
Lanning et al.

(10) Patent No.: US 6,366,299 B1
(45) Date of Patent: Apr. 2, 2002

(54) MULTIDIMENSIONAL INFORMATION VISUALIZATION USING ATTRIBUTE RODS

(75) Inventors: Thomas Richard Lanning, Littleton; Kent Barrows Wittenburg, Lynnfield; Michael Scott Heinrichs, Waltham; Christina Lynn Fyock, Sudbury; Guangjun Li, Waltham, all of MA (US)

(73) Assignee: Verizon Laboratories Inc., Waltham, MA (US)

( * ) Notice: Subject to any disclaimer, the term of this patent is extended or adjusted under 35 U.S.C. 154(b) by 0 days.

(21) Appl. No.: 09/571,993

(22) Filed: May 16, 2000

Related U.S. Application Data

(60) Provisional application No. 60/183,928, filed on Feb. 21, 2000.

(51) Int. Cl.[7] ................................................. G09G 5/00

(52) U.S. Cl. ....................... 345/738; 345/678; 345/663; 345/586

(58) Field of Search ................................ 345/738, 760, 345/771, 782, 678, 663, 586, 664, 757, 689, 970; 707/201, 10, 103

(56) References Cited

U.S. PATENT DOCUMENTS

| | | | | | |
|---|---|---|---|---|---|
| 5,590,250 | A | * | 12/1996 | Lamping et al. | 345/127 |
| 5,815,154 | A | * | 9/1998 | Hirschtick et al. | 345/738 |
| 5,918,232 | A | * | 6/1999 | Pouschine et al. | 707/103 |
| 5,986,673 | A | * | 11/1999 | Martz | 345/664 |
| 6,038,566 | A | * | 3/2000 | Tsai | 707/102 |
| 6,134,552 | A | * | 10/2000 | Fritz et al. | 707/10 |
| 6,212,570 | B1 | * | 4/2001 | Kadlec | 707/201 |
| 6,219,099 | B1 | * | 4/2001 | Zuffante et al. | 345/771 |

OTHER PUBLICATIONS

Ahlberg, C., and Shneiderman, B.(1994) Visual Information Seeking: Tight Coupling of Dynamic Query Filters with Starfield Displays. In CHI '94: Human Factors in computing Systems, ACM Press, 313–317, 479, 480.
Baudisch, Patrick (1998) Don't Click, Paint! Using Toggle Maps to Manipulate Sets of Toggle Switches, Proceedings of UIST 98, Nov. 4, 1998, Madison, Wisconsin, 65–66.
Buja, A., D. Cook, and D.F. Swayne (1996) Interactive High–Dimensional Data Visualization. Journal of Computational and Graphical Statistics, 5(1), 78–99.
Spotfire, Spotfire.net Offerings, from http://www.spotfire.com/products/Default.asp.
Eick, S.G. (1994) Data Visualization Sliders, Proceedings of UIST '94, 119–120.
Inselberg, A. (1997) Multidimensional Detective. Proceedings of IEEE Information Visualization '97, 100–107.
Inselberg, A., and B. Dimsdale (1990) Parallel Coordinates: A Tool For Visualizing Multi–dimensional Geometry. Visualization '90, San Francisco, CA 1990, 361–378, 1990.

(List continued on next page.)

Primary Examiner—Steven Sax
(74) Attorney, Agent, or Firm—Leonard Charles Suchyta; James K. Weixel

(57) ABSTRACT

A system for browsing multidimensional information includes a digital data storage circuit 48 that stores the multidimensional information in a database and a digital logic circuit 44 that imports, manipulates and outputs the multidimensional information in the database in accordance with a mapping model maps each dimension of multidimensional information space to a location in abstract physical space, and a user interface 70 interactively accepts input from a user and, using the mapping model, renders a graphical representation 78 of the multidimensional information space. The graphical representation 78 is responsive to input of user-initiated restrictions on the multidimensional information space by effecting corresponding visible manifestations in the graphical representation 78.

54 Claims, 10 Drawing Sheets

OTHER PUBLICATIONS

Beta Program—Table Lens for Web Publishing, from InXight corporate Web site. http://www.inxight.com.

NetMarket shopping site. http://www.netmarket.com.

Shneiderman, B. (1994) Dynamic Queries for Visual Information Seeking. IEEE Software, 11(6), 70–77.

Shneiderman, B. (1999) Dynamic queries, starfield displays, and the path to Spotfire, from http://www.cs.umd.edu/hcil/spotfire/index.shtml.

MineSet™ 3.0 Enterprise Edition, from Silicon Graphics MineSet™ product page. http://www.sgi.com/software/mineset/.

Tweedie L.A., Spence, R., Dawkes, H., and Su, H. (1996) Externalizing Abstract Mathematical Models, Proceedings of CHI'96, Vancouver, Canada, ACM Press, 406–412.

Tweedie, L.A., R. Spence, D. Williams, and R. Bhogal (1994) The Attribute Explorer. Video Proceedings and Conference Companion of CHI '94, New York, ACM Press, 435–436.

Tweedie, L.A., R. Spence, H. Dawkes and H. Su (1996) The Influence Explorer (video)—a tool for design. Electronic Proceedings of CHI '96.

Silicon Graphics MineSet™, Supporting the Discovery Research Process, Spring 1999.

People Link, from People Link Web site. http://www.peoplelink.com.

* cited by examiner

MULTIDIMENSIONAL INFORMATION VISUALIZATION USING ATTRIBUTE RODS

CROSS-REFERENCE TO RELATED APPLICATION

This application claims benefit of U.S. Provisional Application No. 60/183,928, filed Feb. 21, 2000.

BACKGROUND OF THE INVENTION

1. Field of the Invention

The present invention is directed to a method of information interaction that allows users of computers to more effectively browse multidimensional information and understand hidden relationships contained in that information.

2. Related Art

The basic prior art paradigms for user interaction with and finding of information have not changed significantly in the commercial marketplace for years. In a so-called standard browsing paradigm, users follow hyperlinks, i.e., links to other documents embedded within Hypertext Markup Language (HTML) documents, the type of documents found, for example, on the World Wide Web (the "Web"). The paradigm is named after the popular term "browsing the Web" for navigating the Web using browser software, such as Netscape Navigator or Microsoft Explorer. Such browsing typically begins with broad categories and terminates with detailed listings. False starts require users to back up and try again with often confusing navigation mechanisms.

Another such paradigm will be referred to as a query/response paradigm, used for example when searching using an Internet search engine or index, in which users enter a query and then the system responds with an ordered list of results. Often users have to repeat this pattern several times to refine the query.

Examples of each of the above-mentioned interaction paradigms are ubiquitous, particularly on the Internet. FIG. 1 shows an extended directory example of the query/response paradigm from an online service known as PeopleLink (available at the time of filing at: www.peoplelink.com). The intention of PeopleLink is to support users in finding chat partners who may share their interests. The interaction paradigm here is much the same as any other standard query/response problem.

A user begins by specifying a query by choosing from selection tools, or "widgets" that include drop-down lists and check boxes. Results from the search include a listing of potential partners at reference numeral 2, ordered in this case alphabetically. The listings themselves include links to related information and relevant attribute values, such as whether the individual is online at the time, at reference numeral 3 as well as links to profiles at reference numeral 4 of the listed people.

In this particular example, 3458 matches for the query were found, of which the first 20 are shown at reference numeral 5. There are usually two strategies available for users to proceed from this point: (1) back up and refine the search and/or (2) evaluate the candidate items one by one by flipping through listings pages.

Page flipping and scanning through long lists of result items is tedious and time-consuming, as is query refinement. The problem is magnified when the user is not sure what he or she is looking for. Note that in the directory lookup problem to which the technique of FIG. 1 is directed it is not a trivial matter to determine whether the goal has been reached. It is not at all clear how a user would know if he or she has found a satisfactory chat partner. That determination may depend on what the total set of choices is and how they compare across the attributes available. This type of problem is known as a semi-structured problem, as opposed to a straightforward search of, say, phone numbers by name. Such problems are common in the field of information access, particularly in the shopping domain, and also in many others.

Various information visualization approaches have previously been brought to bear on the information access problem. Such approaches have to date come largely from within academic research communities. One class of prior art solutions to improving on the basic query/response technique has been to seek methods to anticipate search results before issuing the full query, thus speeding the query refinement loop, and improving a query's probability of success. A first step in this technique is to indicate the size of the item set before users issue a query, thus giving the user a hint about how much he or she needs to restrict the set beyond its initial size before going into an evaluation/browsing mode. An even better technique is to provide instant feedback after each part of a query is formed. Such techniques are the basis of Dynamic Querying, a paradigm developed at the University of Maryland. A description of Dynamic Querying can be found in Shneiderman, B., "Dynamic Queries, Starfield Displays, and the Path to Spotfire" (1999).

The basic Dynamic Querying technique uses sliders and other widgets to formulate queries; visual feedback is available instantly at a meta-level on the results of the queries in a separate visualization. Early prototypes used a scatterplot to present abstract query results, but later commercializations have used a variety of visualization techniques.

FIG. 2 shows a screendump from a commercial product called Spotfire, from a company founded by one of the students from the University of Maryland, that utilizes the dynamic querying technique. Queries are made with the sliders 10 at right. Results are visualized with the two-dimensional plots and graphs 12 on the left. Based on information available at the company's website, this product seems to have found its niche in scientific applications. Its sophisticated user interface is not designed to be used by the casual user for, say, shopping, although many earlier prototypes built at the University of Maryland were intended to address more casual users. Shneiderman comments, in the article cited above, on the puzzling fact that these interface ideas have not found easy acceptance within commercial applications such as real estate and movie databases.

It does not appear in any event that these commercial sectors have acknowledged the significance of the interface in the information access problem. One possible factor is that the implementations typically have not been built with mass-market Web browsers in mind. In fact, many of the basic performance goals would be difficult to achieve on the Web without specialized browser plugins.

A group headquartered at the Imperial College of London integrates the query mechanism with the results display using dynamic histograms. The research prototypes Attribute Explorer and Influence Explorer use interactive histograms to explore the relationships of attributes in a given set. These techniques are described in several articles: Tweedie, L. A., Spence, R., Dawkes, H., and Su, H. (1996) "Externalizing Abstract Mathematical Models", Proceedings of CHI '96, Vancouver, Canada, ACM Press, pp. 406–412; and Tweedie, L. A., R. Spence, D. Williams, and R. Bhogal (1994) "The Attribute Explorer", Video Proceedings and Conference Companion of CHI '94, New York, ACM Press, pp. 435–436.

FIG. 3 shows how Attribute Explorer makes use of synchronized interactive histograms to make queries and exhibit attribute relationships in a data set. This example domain relates to housing. In the example shown in the figure, there are three attributes: price 20, distance from a certain location 21, and size of the garden (lawn) 22. Histograms are used in all cases to show the distribution of the data across these attributes. A user can restrict an attribute's value range by interacting with the sliders at the bottom of the windows; results are painted back onto all the displays by coloring the histograms.

Interactive histograms have the advantage of showing aggregate relationships clearly. The display is by value rather than by item. That is, a value range is plotted on an axis and the number of items that fall into that value is plotted on the second axis to yield a histogram. This is done for each attribute dimension.

In the area of evaluation of result items, many existing sites have turned to methods for direct attribute comparison through tables. The more advanced of these may allow users to sort the tables interactively by different attributes. A good example of a shopping site that has some of these table comparison features is Netmarket, whose website, at the time of filing, is http://www.netmarket.com.

Table layouts are appropriate when the number of items and attributes is relatively small. A table view for a set of hundreds of items and dozens of attributes would obviously be ineffective. Viewing alone would be difficult because the table size would greatly exceed screen real estate, requiring extensive scrolling. More significantly, users cannot be expected to grasp the complex relationships and trade-offs between items and their attribute values in a large table without some additional help. Sorting with large tables may support the task of finding a known target or selecting an unknown item if criteria are simple. It is not difficult with such methods to find the least expensive item, for instance, but many selection and shopping decisions are much more complex and may require understanding the relationship of price to other attributes.

A more advanced table-based visualization tool has been announced from InXight, a Xerox Parc spin-off. It is a commercialization of research conducted at Xerox Parc on a tool called TableLens. It ultimately may offer an interesting avenue for applications such as shopping, but so far it is directed to sophisticated users in business intelligence domains.

The vast majority of academic prototypes and commercial tools in the visualization arena are directed to sophisticated users engaged in scientific pursuits or numerical business analysis. There are hundreds of such products on the market. One example is MineSet™ from Silicon Graphics, which takes the approach of seeking a projection of multidimensional data onto an absolute positioning in 3- (or 2-) dimensional space. Information from other dimensions can then take the form of decorations, such as color, that can be painted into the basic visualization.

A technique from the data visualization community called Parallel Coordinates presents each information dimension separately but in parallel. See Inselberg, A. (1997) "Multidimensional Detective." Proceedings of IEEE Information Visualization '97, pp. 100–107; and Inselberg, A., and Dimsdale, B. (1990) "Parallel Coordinates: A Tool For Visualizing Multi-dimensional Geometry." Visualization '90, San Francisco, Calif. 1990, pp. 361–370.

In this technique, each dimension is ordered and plotted. Lines are drawn across the dimensions in order to show relationships. The above technique relies on a static visual presentation with pattern recognition and is not interactive.

While some data visualization tools address the need to understand global information dimensions and their relationships, most prior art data visualization tools are not for the casual user nor are they targeted to tasks such as shopping on the Internet. Such tasks typically require not just understanding statistical correlations across multiple attributes, but also the need to jump back and forth from a global context to the details of individual items. The shopping task, along with information seeking dialogs in general, is characterized by the need to whittle down a large initial set of choices to just a few.

Further, while both the hyperlink and query/response techniques may be effective if the user knows what he or she is looking for, they can be unwieldy as discussed above, and if the user does not have a definite idea what he or she is looking for, are not conducive to obtaining useful results. While the information sciences have been exploring improvements to the internals of query matching for decades, the user interaction paradigm deployed commercially has remained largely unchanged.

Thus there is a need for developing techniques for multidimensional visualization that are easy to use and which integrate aggregate attribute information with browsing of individual items.

SUMMARY OF THE INVENTION

In consideration of the above problems with the prior art, in accordance with a first aspect of the present invention, there is provided a system for browsing multidimensional information. The system comprises: a digital data storage circuit that stores the multidimensional information in a database; a digital logic circuit operable to import, manipulate and output the multidimensional information in the database in accordance with a mapping model that maps each dimension of multidimensional information space to a location in abstract physical space; and a user interface that interactively accepts input from a user and, using the mapping model, renders a graphical representation of the multidimensional space. The graphical representation is responsive to input of user-initiated restrictions on the multidimensional information space by effecting corresponding visible manifestations in the graphical representation.

In accordance with one aspect of the present invention, there is provided a system for browsing multidimensional information. The system comprises: a digital data storage circuit that stores the multidimensional information in a database; a digital logic circuit operable to import, manipulate and output the multidimensional information in the database in accordance with a mapping model that maps each dimension of multidimensional information space to a location in abstract physical space; and a user interface that interactively accepts input from a user and, using the mapping model, renders a graphical representation of the multidimensional information space. The graphical representation is responsive to input of user-initiated restrictions on the multidimensional information space by effecting corresponding visible manifestations in the graphical representation.

In accordance with another aspect of the present invention, there is provided a method for browsing multidimensional information in a database, the method for use on an apparatus having a digital logic circuit operable to import, manipulate and output the multidimensional information in the database. The method comprises: (a) mapping each dimension of multidimensional information space to a location in abstract physical space; and (b) interactively accepting input from a user and, using the mapping, rendering a graphical representation of the multidimensional information space. The graphical representation is responsive to input of user-initiated restrictions on the multidimensional information space by effecting corresponding visible manifestations in the graphical representation.

In accordance with yet another aspect of the present invention, there is provided an apparatus for browsing multidimensional information in a database. The apparatus comprises: digital logic means for importing, manipulating and outputting the multidimensional information in the database in accordance with a mapping of each dimension of multidimensional information space to a location in abstract physical space; and user interface means for interactively accepting input from a user and, using the mapping, rendering a graphical representation of the multidimensional information space. The graphical representation is responsive to input of user-initiated restrictions on the multidimensional information space by effecting corresponding visible manifestations in the graphical representation.

In accordance with still another aspect of the present invention, there is provided a computer-readable medium storing code executable by a processor-controlled apparatus to perform a method for browsing multidimensional information in a database, the apparatus having a digital logic circuit operable to import, manipulate and output the multidimensional information in the database. The method comprises: (a) mapping each dimension of multidimensional information space to a location in abstract physical space; and (b) interactively accepting input from a user and, using the mapping, rendering a graphical representation of the multidimensional information space. The graphical representation is responsive to input of user-initiated restrictions on the multidimensional information space by effecting corresponding visible manifestations in the graphical representation.

In accordance with another aspect of the present invention, there is provided a system for browsing multidimensional information available on a network. The system comprises: a digital logic circuit operable to import from the network, manipulate and output to the network the multidimensional information in accordance with a mapping model that maps each dimension of multidimensional information space to a location in abstract physical space; and a user interface that interactively accepts input from a user and, using the mapping model, renders a graphical representation of the multidimensional information space. The graphical representation is responsive to input of user-initiated restrictions on the multidimensional information space by effecting corresponding visible manifestations in the graphical representation.

In accordance with another aspect of the present invention, there is provided a system for browsing multidimensional information available on the Internet. The system comprises: a digital logic circuit operable to import from the Internet, manipulate and output to the Internet the multidimensional information in accordance with a mapping model that maps each dimension of multidimensional information space to a location in abstract physical space; and a user interface that interactively accepts input from a user and, using the mapping model, renders a graphical representation of the multidimensional information space. The graphical representation is responsive to input of user-initiated restrictions on the multidimensional information space by effecting corresponding visible manifestations in the graphical representation.

DETAILED DESCRIPTION OF THE PREFERRED EMBODIMENTS

Figure 1:
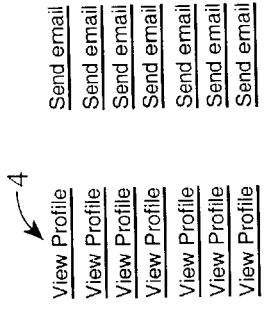
FIG. 1 shows a prior art example of a query/response data interaction paradigm.
Figure 1:
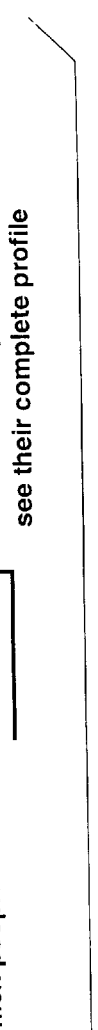
Figure 2:
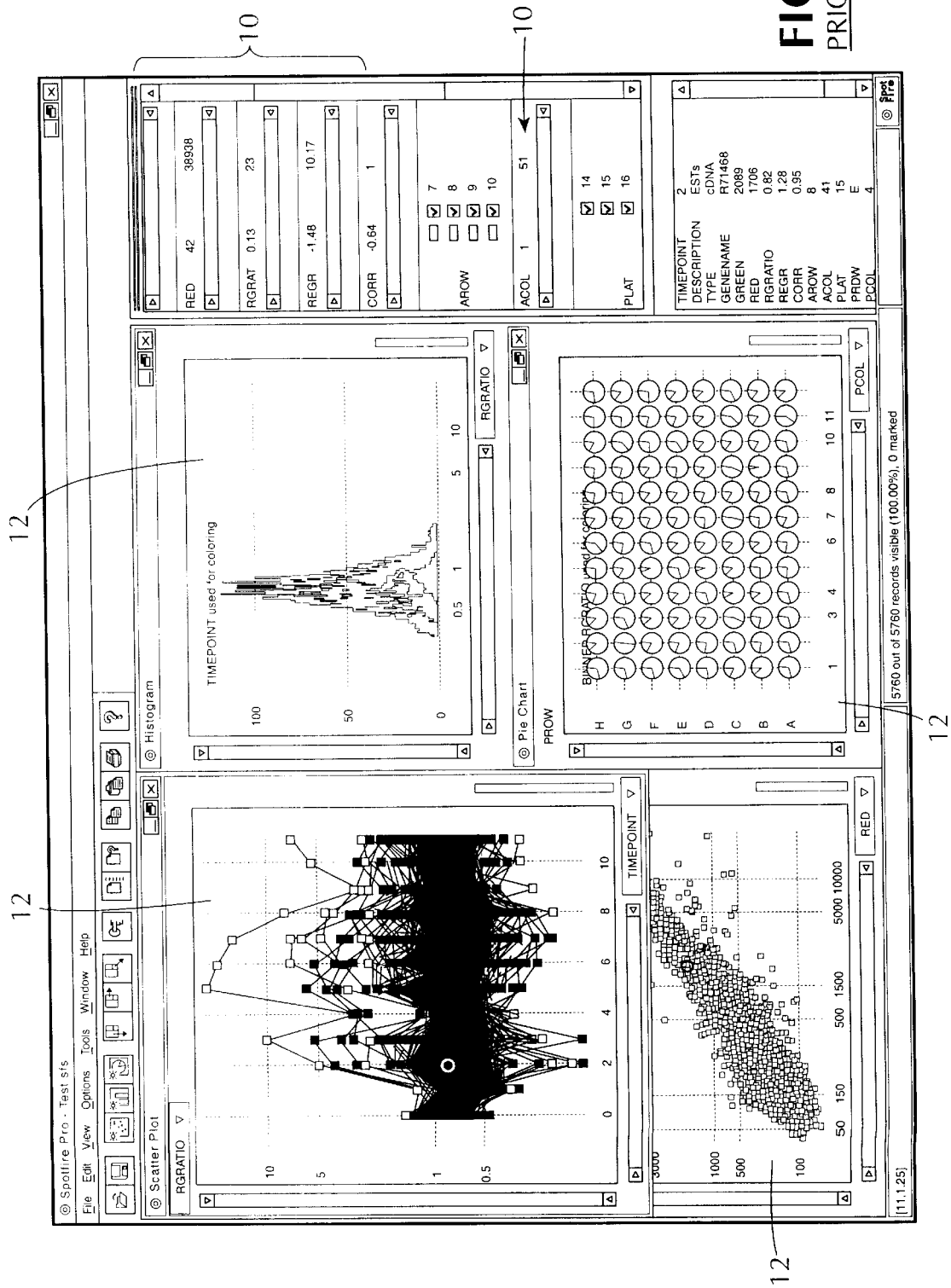
FIG. 2 shows a screen dump from a prior art commercial product that utilizes the dynamic querying technique.
Figure 3:
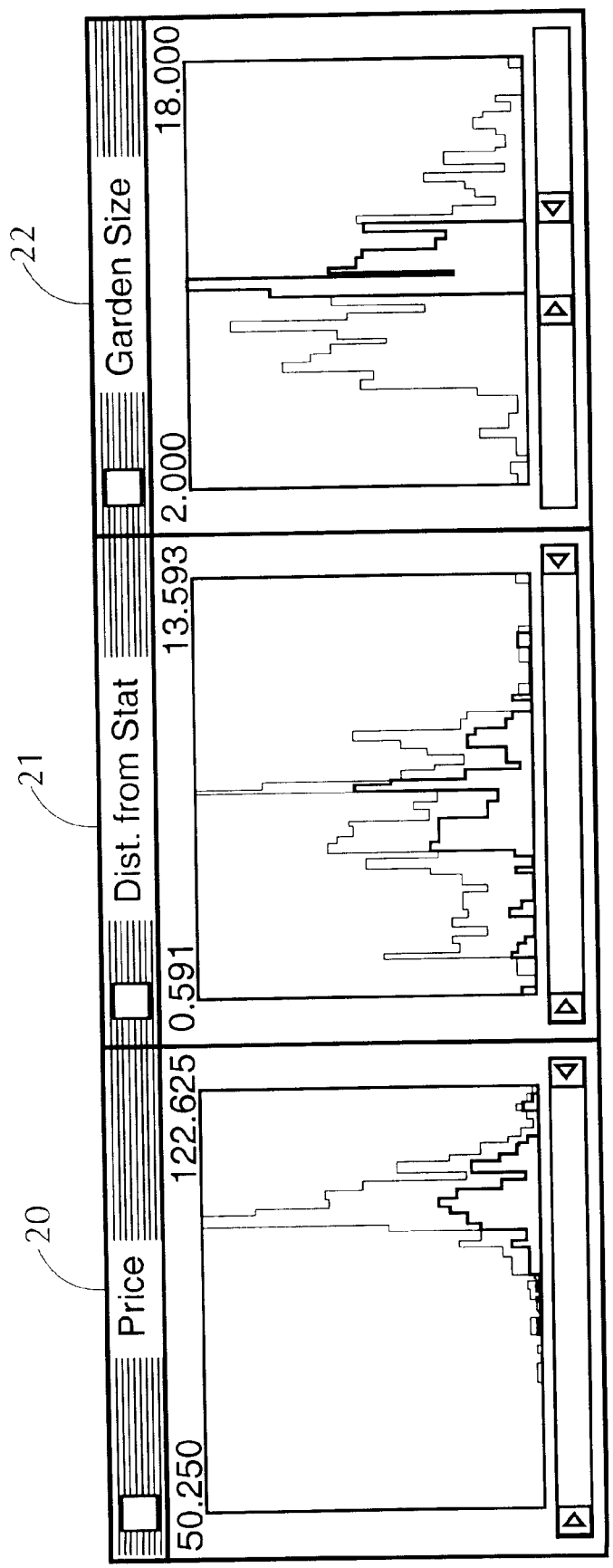
FIG. 3 shows an example of the prior art technique of interactive histograms.

In accordance with a preferred embodiment, the present invention includes an information model, derivable from relational databases or other sources, that assigns to each item in the information space a multidimensional location in the physical/graphical space. The information model affords advantageous human-computer interactions for exploring relationships among attributes and navigating item by item. The information model also includes presentation information for items, values, dimensions, and overall space. Each of these can have a picture, text, audio, and foreground/background colors.

The primary visual metaphor utilized by a preferred embodiment of the present invention is based on sliding rods, each of which is associated with an information dimension from the underlying information model. One advantageous interaction technique of the present invention is based on dragging rods from side to side, placing new individual items of interest in focus. As will be shown, rods may be presented in parallel alignment or crossed at the center. Users can also interactively select value ranges along the rods in order to reveal hidden relationships. They can then filter their working candidate set to just their selections.

By virtue of the above, once a dataset is loaded or made available to a client workstation of a user, he or she can explore aspects of the information space and navigate across individual items within the same visual and interaction context without return trips to the server and their associated delays.

The invention also includes a process for importing data in an extensible markup language (XML) document format, data from relational database query results, and comma separated value (CSV) files, a standard format for MS Windows spreadsheets. The invention also includes a process and representation that facilitates the rapid and efficient retrieval, filtering, and display of the data set.

In a preferred embodiment, the present invention starts with an integration of two different but closely related perspectives on modeling information. The first, the traditional information theory model, represents the information space (or domain) as a collection of entities, attributes of those entities, and the values associated with those attributes and entities. The second, the physics and computer graphics model, uses dimensions, coordinates along those dimensions, and the items residing (points plotted) at those coordinates. These two models are isomorphic. Entities map to items. Attributes map to dimensions. Values map to coordinates. By advantageously using both models, the present invention allows users to develop insights into the problem of modeling multidimensional spaces that might be missed if using only a single model.

The present invention makes use of an important insight gleaned from this perspective, i.e., that each item in the information space can have a location in a "physical" space. The problem, of course, is that the space is multidimensional. The approach of the present invention is to create visualizations of each dimension independently and to synchronize them. Every item has, or can be assigned, a linear position along a dimension through a sorting mechanism.

In contrast to prior art systems that project multidimensional data onto an absolute position in 3- (or 2-) dimensional space, the present invention takes the approach that each dimension can be ordered and presented independently as simple sequences of items whose selections and foci can be synchronized.

As will be seen, the assumptions discussed above allow for the building of user interface components to explore the information space by visualizing the effect of value restrictions (queries) on the space in the aggregate as well as to navigate the space through a stepwise sequence of relative views.

The present invention shares the principle of immediate feedback with dynamic querying techniques discussed above, but integrates the query widgets with presentation of results rather than utilizing separate visualizations. Also, the emphasis on contextualized browsing of individual items is a differentiator, along with the underlying principles of an integrated graphical and multidimensional information model.

In comparison with interactive histograms discussed above, in the present invention, each horizontal position on a dimension rod is associated with an individual item rather than a value. Value distributions can be plotted on the vertical dimension within the rod. This difference is related to the fact that the sliding rods technique of the present invention, to be discussed in more detail below, requires each individual item to be associated with a unique horizontal position. Plotting by value is good at reflecting aggregate distributions. It is also likely to scale better than sliding rods. However, plotting by individual item as in the present invention has the advantage of revealing a stronger visual signature for individual items as well as reflecting correlations through animation of sliding rods via visual alignment. Overall, it is believed that the use of sliding rods as in the present invention is superior for browsing functions since a natural gesture is utilized to view nearby items in any dimension. In contrast to prior art techniques, the present invention reveals relationships that depends on user interaction, not a static visual presentation with pattern recognition.

Figure 4:
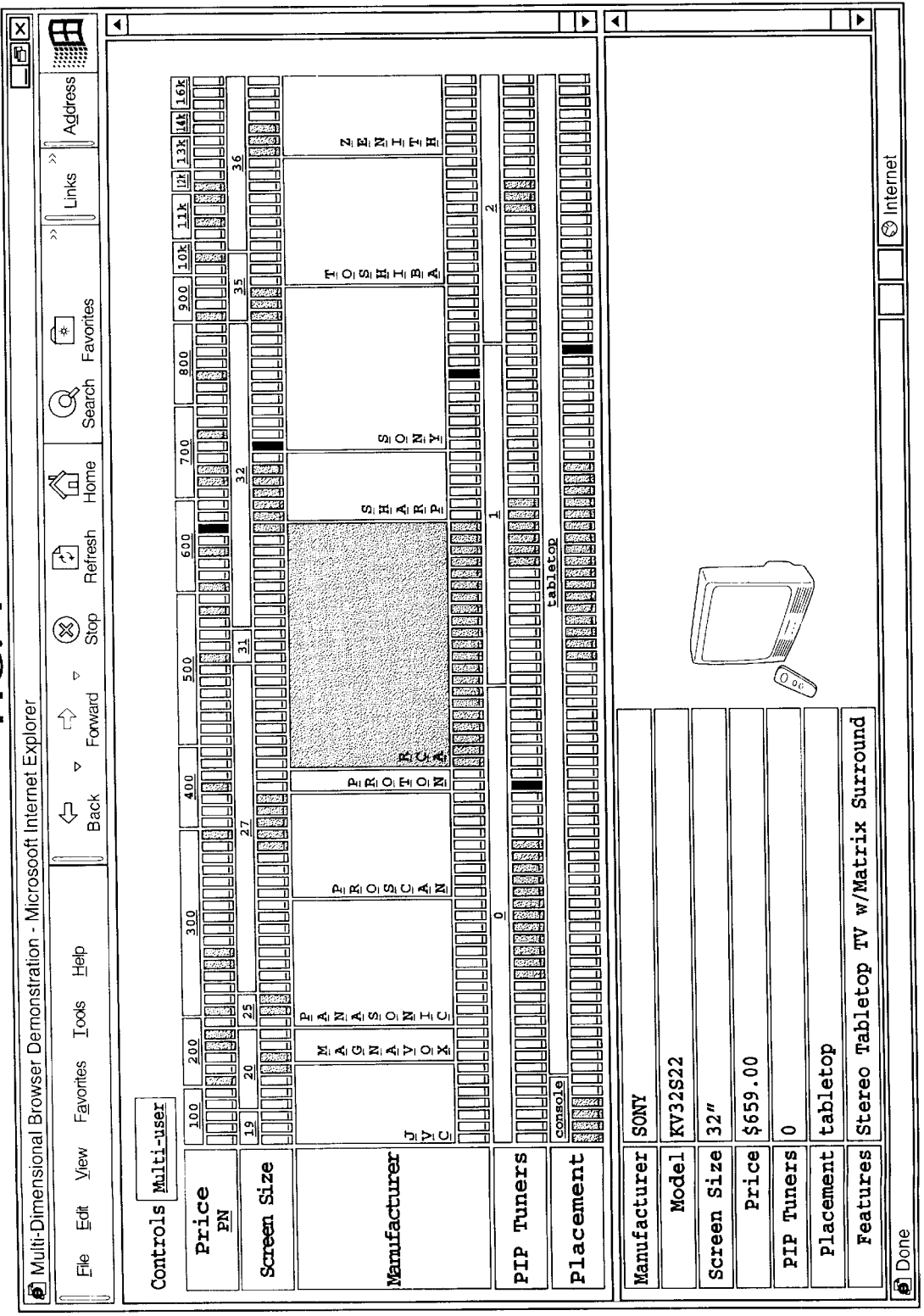
FIG. 4 shows an example of a first preferred embodiment of the present invention in which data attributes are represented by parallel rows.

An example of a first embodiment of the interface component of the present invention is shown in FIG. 4. In this embodiment, attributes are represented by parallel rows. The content shown in that figure consists of a set of product data for 100 televisions. Each of the rows in the visualization is labeled with an attribute in the data set, e.g., price. The fact that there are 100 items is represented by the fact that there are 100 bars positioned in each row. Each of the bars represents a different item, and they are all sorted. Items are sorted first by their value for the current dimension. Items with the same value for that dimension are then sorted by their values in the remaining displayed dimensions, starting with the top-most displayed dimension. Thus it can be seen that each item has a "physical" position in each attribute row. It is acknowledged that not all attributes admit a natural sort order, but all attributes can be sorted, even if arbitrarily. Preferably, in this embodiment, the default text type uses alphanumeric sorting.

Next each attribute row is labeled with values for that attribute. Price, for example, has been segmented into ascending groupings of $100, $200, etc. The length of the value cell grouping is an indication of the distribution of the items across value ranges. Thus it can be seen from the first row that the prices of televisions range from $100 to $1600, and that most fall in the range of $300–800.

At the bottom of the figure is detailed information about one television set. The user clicked on one of the bars in a row, which was then highlighted (painted black) simultaneously in all rows. By observing the position of the black bar, the user can get a quick sense of where this product falls in the space as a whole by seeing its position in each attribute sort. In this example, we can see that this Sony television falls in the lower-middle distribution of price, the lower end of screen size, and so on. Thus we get both a global view of the "context" of this item in the set as a whole as well as a detailed view. If the user chose to, he or she could browse individual items in this manner.

For instance, if the user is interested in seeing what television is at the extreme high end of the price distribution, that is, what one gets by paying $1600 for a television, the user can click on the bar at the extreme right end of the first row to find the answer.

The invention illustrated in FIG. 4 also allows interactive attribute-based data exploration. The large area highlighted in the middle of the figure is an indication that the user selected RCA in the manufacturer row. The effect is to make a restriction on the data set. The result is shown through changing the color of all item bars that match that restriction. The set of item bars with the value of RCA is then changed—the darker color is visible in the middle of the figure under the RCA area—but the same set is made visible in every other attribute row as well. Thus a user can see that RCA has products that range from $200 to $800 and from 20" screen size to 36" screen size. The user could continue to restrict the query further by clicking on other value cells. A click on another attribute row is treated as a logical AND. Thus a user could quickly discern the price range of RCA televisions in the 27" screen size by clicking on the value cell 27 in the attribute row screen size.

A click in the same attribute row is treated as a logical OR. Thus a user could ask the same questions for the set of Sonys and RCAs together by clicking on Sony.

Figure 5:
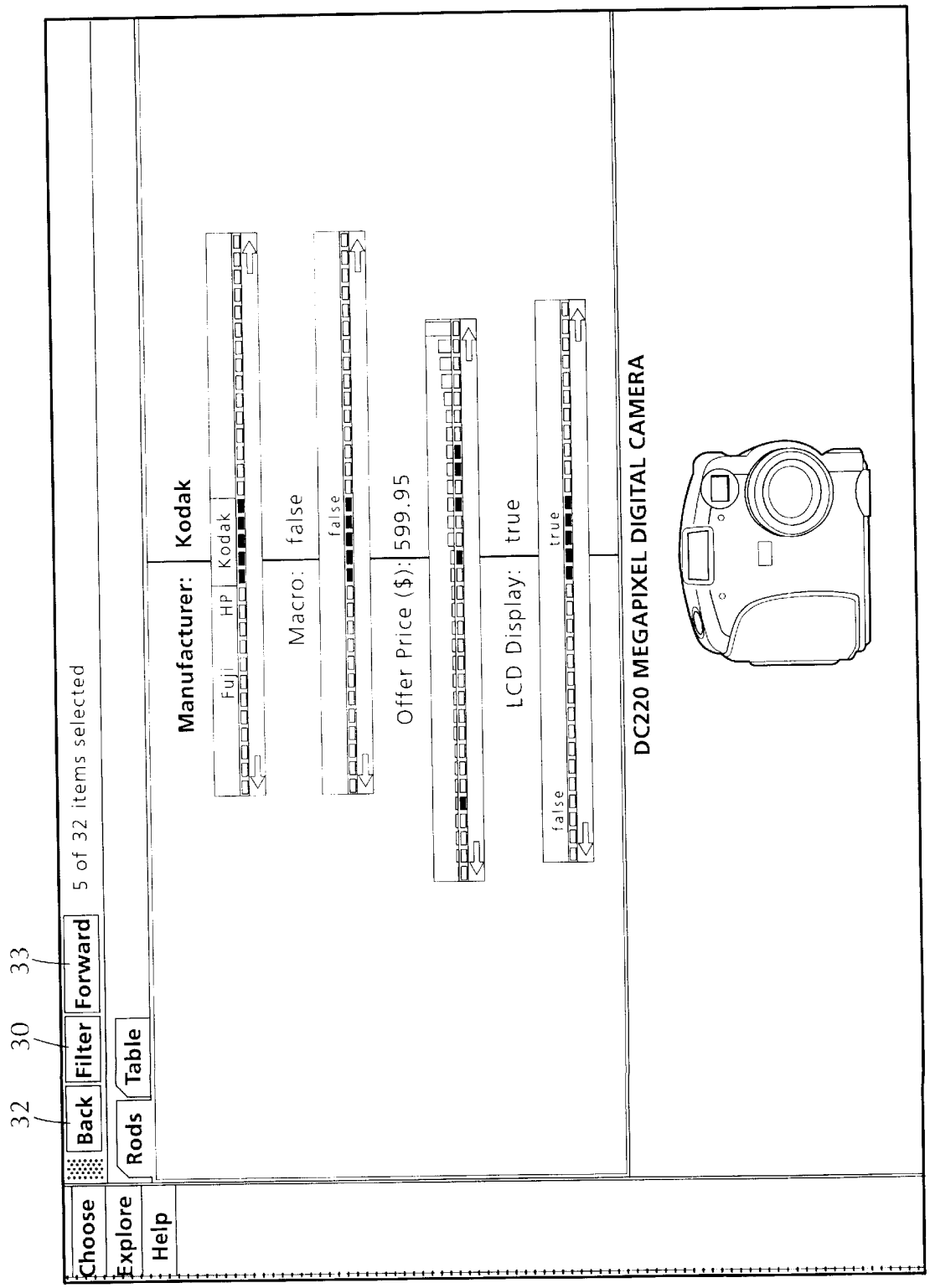
FIG. 5 shows an example of a second preferred embodiment of the present invention in which data attributes are represented by sliding rods.

FIG. 5 shows a second embodiment of the present invention that uses sliding rods to represent attributes. The functionality of this embodiment may be considered a superset of the one shown in FIG. 4. A major difference between the second embodiment and the first is that the attribute rows, instead of remaining static during interactions, slide back and forth. The horizontal position of each of the attribute rods is determined by the item in focus. The rods are aligned such that the focused item is always in the center position. When the user moves the pointer over a value, or item, the value or name of the item is displayed.

A scenario of how a user preferably interacts with the sliding rods will next be described. First, the user moves the mouse cursor over the lower part of a rod until the cursor changes to a drag cursor. At this point, the user clicks down and drags the rod from side to side (or uses the keyboard arrow buttons). During the dragging of one rod, all the other rods move as well. Since the same item resides at some position on each of the other rods, the rods all move left or right as necessary to align that same item in the center. Users can see correlations by noting which rods tend to move in the same or different directions. For instance, it may be noticed in a product set that price generally goes up as some other attribute, such as screen size or resolution, goes up. In that case rods will move in the same direction and tend to be horizontally aligned. Reverse correlations will be exhibited by rods moving in different directions and "anti-alignment" in the horizontal plane. Attributes that do not correlate will be evident by rods that jump seemingly randomly while one of the rods is moved. While statistical analysis and other visualization methods are superior at revealing overall correlations, an advantage of this interactive method is that partial correlations over some restricted range of values might become evident.

Another interaction technique allowing users to move items into the center or focus position by clicking on the item marker anywhere on the rod, which has the effect of causing that item to become the focus, and causing all the rods to shift.

In addition to the sliding rods, the invention also affords other interaction instrumentalities for users to glean information about the data set. As with the parallel rows of the first embodiment, the second embodiment allows users to interactively select value ranges and see distributions in other dimensions of those items selected through value restrictions. However, the second embodiment makes use of a "painting" selection technique to provide this functionality. Instead of just clicking, users can drag across the attribute value areas to select contiguous value ranges. Noncontiguous value ranges can be added as well.

In FIG. 5, the user has dragged across the area labeled "Kodak" to select products from only that manufacturer. The price ranges and so on of the restricted item set are colored on the other attribute rods. At any point a user may filter the set of items in view by clicking the "Filter" button 30 . The previous set is then replaced with a view of the restricted set in accordance with the second embodiment. Users may navigate through a history stack of previous supersets or subsets through the "Back" and "Forward" buttons 32 and 33 respectively.

Users can also note outliers as well as minimum and maximum value ranges on the attribute rods. If the attribute is of numerical type, then bars are shown for each value relative to the range in the current set. For example, in FIG. 5 it can be seen that most of the digital cameras in this set are similarly priced in the low end of the distribution range. However, there are a few high-priced items at the right fringe.

The present invention uses a similar technique for time/date value types. Bar graphs as used in the present invention differ from interactive histograms as discussed earlier in that the bar graphs of the present invention do not aggregate by value. Rather, they require that the primary axis be an ordering of individuals in the set.

Labeling values is a challenge for data sets of more than trivial size. The first embodiment of FIG. 4 illustrates one strategy in which all values are labeled, even if it takes up a significant amount of vertical screen real estate. In order to handle larger data sets with more attributes, the second embodiment of FIG. 5 is based on a labeling strategy that uses minimal space, at the cost of requiring more interaction to extract the information. In the implementation shown in FIG. 5, value labels are added to the attribute rods only if there is room. Otherwise, users may examine values through a tool tip mechanism. If they place the mouse over the upper half of any of the rods, then a screen appears with the value of that attribute of the item at that position.

Figure 5A:
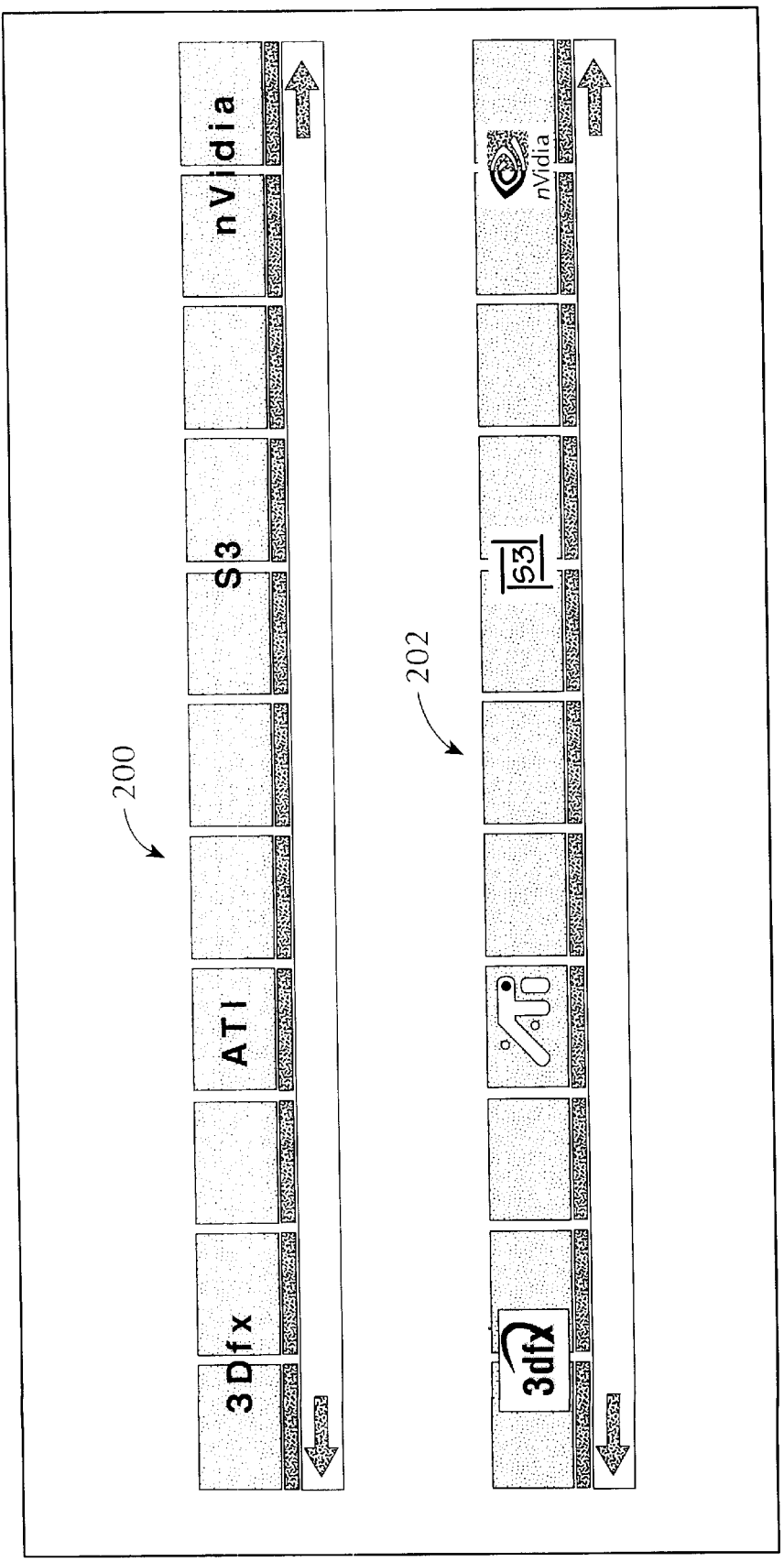
FIG. 5A shows two different methods of labelling values shown in the sliding rod representation.

FIG. 5A shows two preferred implementations of value labelling for the sliding rods. In the upper example 200, a textual example is shown. That is, the names of the companies forming the values are represented as text along the sliding rod. In the lower example 202, instead of text, an associated icon, such as the corresponding company's logo, are used to represent the value.

Figure 6:
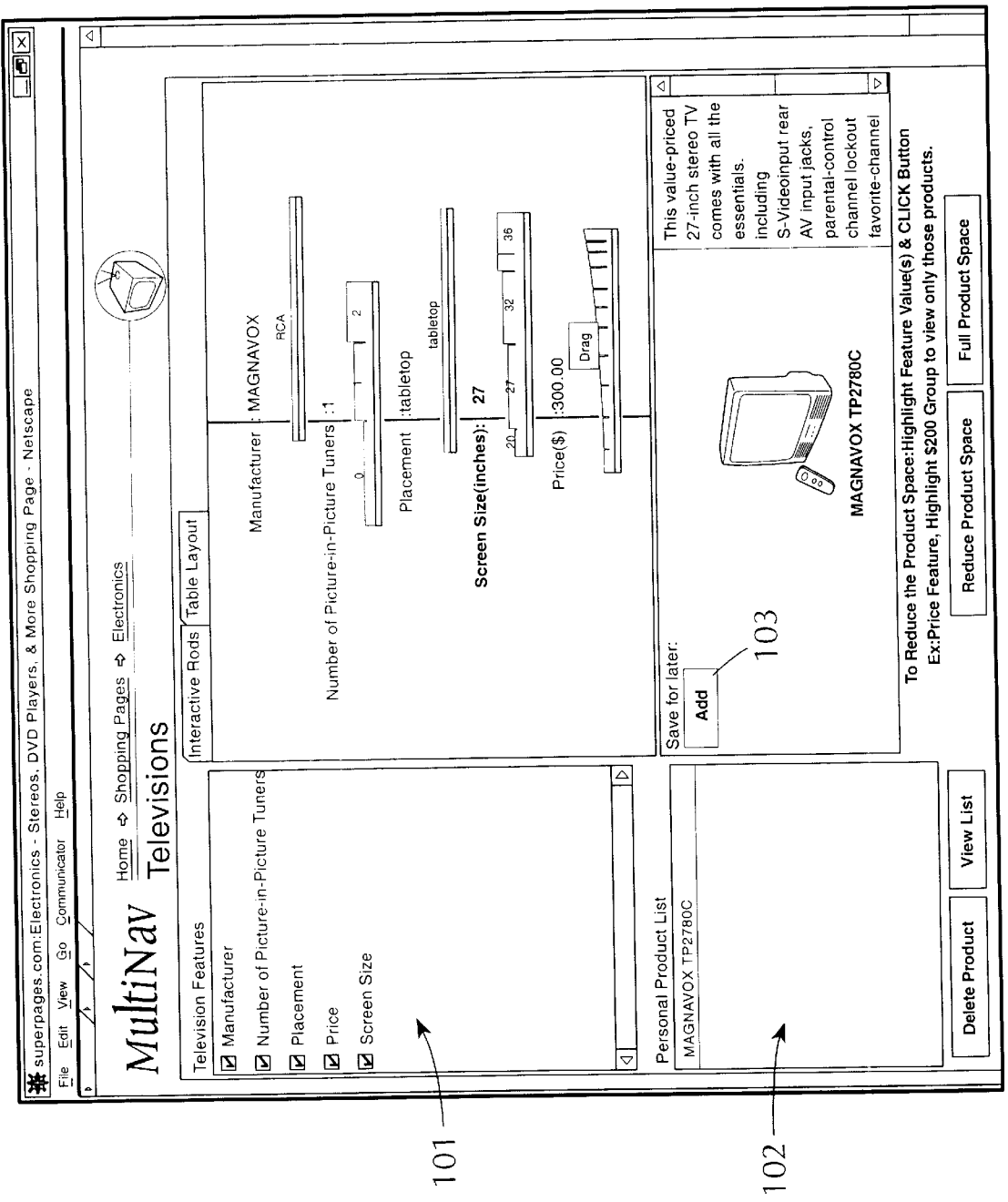
FIG. 6 illustrates a preferred utilization of the present invention as effected by an applet running in a browser.

The data visualization techniques of the present invention are particularly advantageous when a set of items of appropriate size and having a common attribute schema has been selected in some overall information dialog. Methods that might be used to select such a set include browsing over hierarchically organized categories or initiating a query. Such an initial aspect to the dialog is evident on any of the comparison shopping sites on the Web today. In a preferred utilization of the present invention, at the point when a user has denoted a set of items, an applet, a machine independent computer program designed to run on a browser, can be inserted into the dialog. FIG. 6 shows one example in the context of a comparison shopping prototype. In the example, users have previously selected the category "televisions" for further investigation. This example site holds information on 100 television products, a high number of products, and particularly suited for the present invention.

Evident in FIG. 6 are two other functions available for users. First, a set of attributes 101 is shown in the upper left pane. Users may interactively select those attributes that they wish to view in the sliding rods component by selecting checkboxes. Preferably, any number of attributes may be made available for selection. Second, in the lower left area 102 of the figure one can see a pane labeled "Personal Product List." Users can add any focused item from any of the views to the personal product list by clicking the "Add" button 103. This list itself may later be visualized as a table or within the sliding rods view, tables being a preferable way of viewing small sets.

Although these additional panes are shown simultaneously in a "frame" layout in FIG. 6, such panes do take up precious screen real estate. In an alternate embodiment, popups and tabbed screen replacements may be used to address this same functionality.

Figure 7:
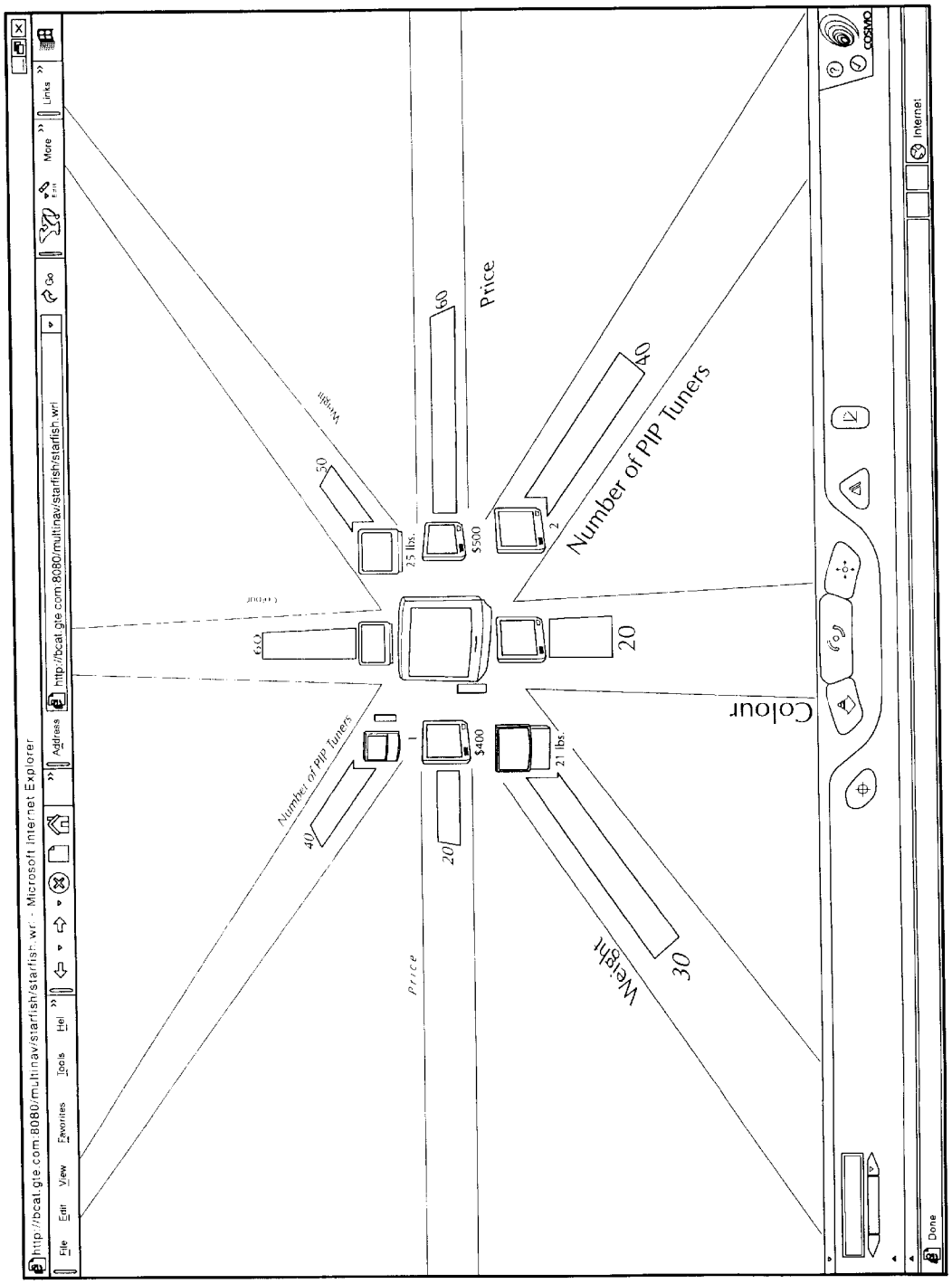
FIG. 7 shows an example of a third preferred embodiment of the present invention in which data attributes are represented by sliding rods in a starfish configuration.

Other layouts usable in the technique of the present invention exploit the focus/context aspect of the inventors' multidimensional model even more. It is assumed that any single item has a location in all dimensions. Thus global views can be produced relative to any single item. What will be referred to as a "starfish" layout is shown in FIG. 7. Here, the focused item is at the center of some number of attribute dimension rods. Nearby items radiate out from the center item, and we may be able to see more detail for closer items than for those further away.

One can begin to see interesting relationships to real-world product layouts in brick-and-mortar store aisles, maximized for browsing and sales opportunities. However, in this multidimensional world, the same items can simultaneously appear in multiple locations, depending on the attribute dimension. As one slides any of the dimension rods (or clicks the arrows at their ends), the other dimensions must reconfigure themselves so that the focused item is in the view's center. The same product may be far away when looking in the "price" aisle but immediately adjacent in the "screen size" aisle.

The information visualization tool of the present invention preferably can be linked with several data sources. These data sources preferably include XML documents, CSV files, and relational database tables.

The functionality of the present invention with regard to XML documents allows any number of items along with any number of attributes. It includes meta-information regarding type and desired presentation. Presentation information is relevant to items (as exemplified in the detail view panes in FIGS. 4–7), but also to attributes and values. A value for an attribute such as camera resolution may be represented by a single integer for the purposes of sorting but be displayed as a text string such as "800×600" in the rod label. Information spaces developed in accordance with the present invention can be exported as XML documents, which maintains the structure and presentation of the data model, and can also read and write themselves to binary storage through any standard serialization mechanism. In view of the characteristics of XML discussed above, XML is the preferred data format for the present invention.

In order for existing data to take advantage of the present invention, comma separated variable (CSV) import and relational database bridges are also provided, using conventional data interface techniques. CSV is an interoperable exchange format supported by Microsoft Windows applications including Microsoft Excel. The fact that the present invention can read CSV format means that any Excel spreadsheet can be exported and viewed with the present invention. The present invention also includes a relational database bridge using Java Database Connectivity (JDBC), a Java application program interface that enables Java programs to execute structured query language (SQL), a standard query language for requesting information from a database. This allows an SQL query to be sent by the present invention to a networked database and its table of results interpreted and displayed.

The invention makes use of this I/O flexibility to explore any number of datasets, including demographic statistics for towns, business investment information, and various types of products.

The data presentation techniques of the present invention are not limited to the visual techniques described in detail above. The present invention allows for the display of short summary information as well as more detailed information. Each item, value, dimension may have an associated short text/long text, small icon/big picture, and/or short sound/long sound.

Figure 7A:
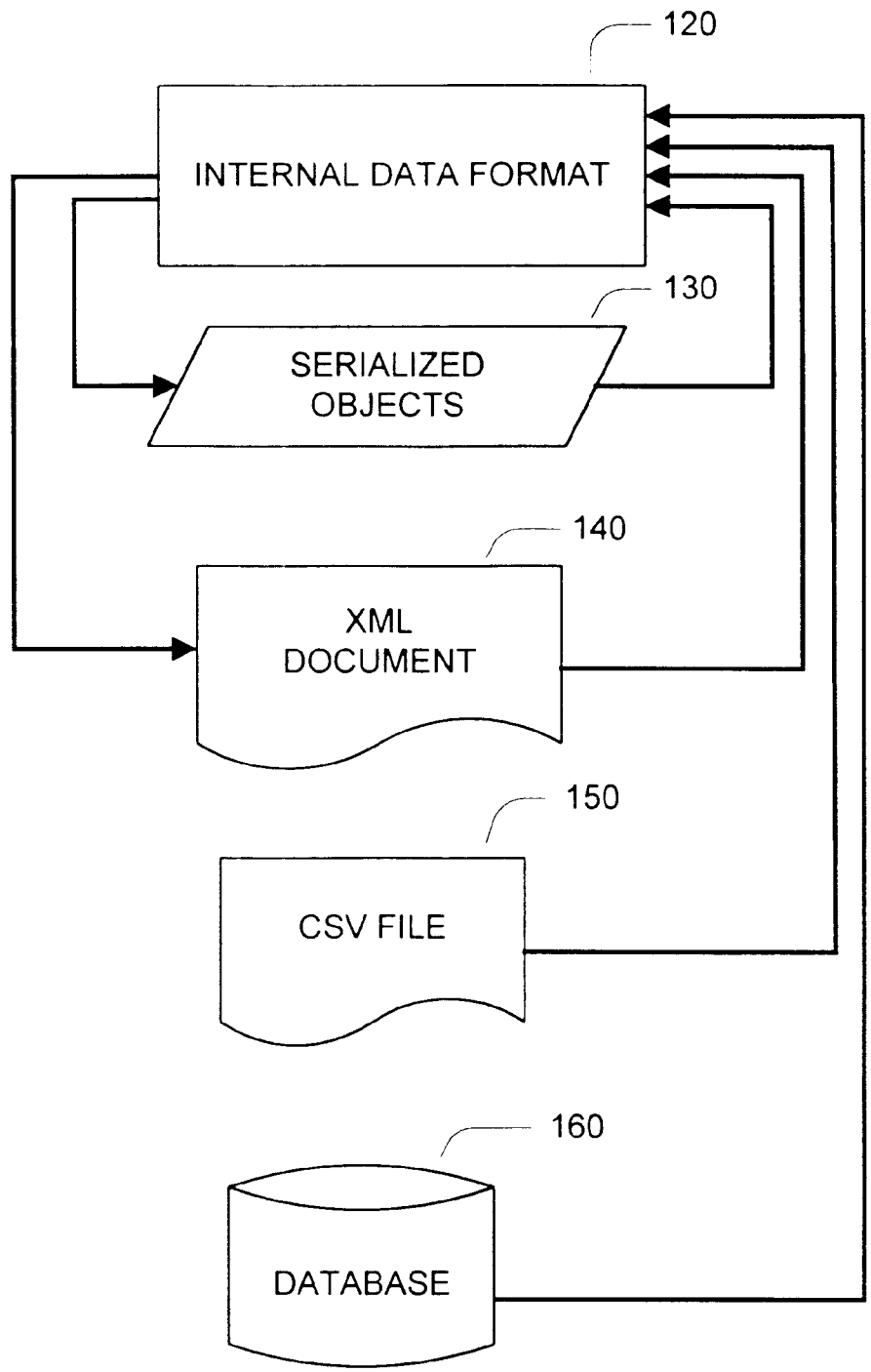
FIG. 7A is a flowchart that illustrates how the internal data format of the present invention interfaces with a variety of data formats.

The present invention interfaces with currently available data formats in the manner shown in the flowchart of FIG. 7A. As can be seen in the figure, internal data format 120, made up preferably of Java objects, is used in the data visualization process of the present invention. The internal data format 120 is structured to accept data in a variety of formats and write the internal structure to external formats to allow for later retrieval. This structure permits data translation to and from several different formats. Theoretically any number of formats can be supported by this structure. In the preferred embodiment, the present invention can accept data from XML documents, adhering to an XML document type definition (DTD), from serialized Java objects, from comma separated value (CSV) files, a standard format supported by numerous spreadsheet programs, and from relational database tables using standard structured query language (SQL) mechanisms. For the CSV, XML and serialized Java objects, the interface simply takes the local file, reads the data, and translates to the internal data format. For SQL, as discussed above, JDBC is used for the translation.

The flowchart of FIG. 7A illustrates how the internal data format 120 interfaces with the serialized objects 130, an XML document 140, a CSV file 150 and a database 160.

The internal data format of the present invention is structured to facilitate rapid conversion from stored multi-dimensional data to a graphical representation of the data. To achieve this, the internal data structure utilizes three categories: dimensions (or attributes), values, and items.

Examples of dimensions, in relation to automobiles, might be "price" and "make". The values for the price dimension could be: "$10,000", "$12,500", etc. Likewise for the make dimension, values could be: Ford, Nissan, Honda, etc.

Items are individual instances in the stored data. For example, in automobiles, the Honda Odyssey SE and the Toyota Camry LE are items. The Odyssey SE being an item having a value "Honda" in the "make" dimension, and a value "$26,500" in the "price" dimension.

The inventors have discovered a data format that involves linking these components in a manner that facilitate the rapid display changes required in the above-described data visualization techniques. In particular the internal data structure includes a list of dimensions. Each dimension is structured to point, by any conventional pointer technique, to a list of values for that dimension. Each value in turn points to a list of items having that value. For example, in the automobile example, the dimension "make" has pointers to "Honda", "Ford", "Nissan", "Chrysler", etc. Each unique value, for example "Honda", itself has pointers to items having that value, for example: "Accord", "Odyssey", etc. The values are sorted, if possible by magnitude, to assist in proper visualization in manner that has been previously described. If sorting by magnitude is not possible, for example for car "makes", the values are still sorted, for example alphabetically.

To further facilitate the real-time data visualization techniques in the illustrated embodiments described above, each dimension, value and item has associated presentation information stored in correlation therewith. For example, all items having the value Ford might be shown with a blue background. Further, the value Ford, rather than simply being shown in text, may be represented by an icon of the Ford logo. These examples are only illustrative. It will be appreciated that many other types of visual, audio/visual, and iconic presentation data may be stored to assist in the representation of the multidimensional data in accordance with the present invention. Further, as a result of the advantageous format described above, all items having like values are grouped together, further facilitating the real-time visualization techniques of the present invention.

Figure 8:
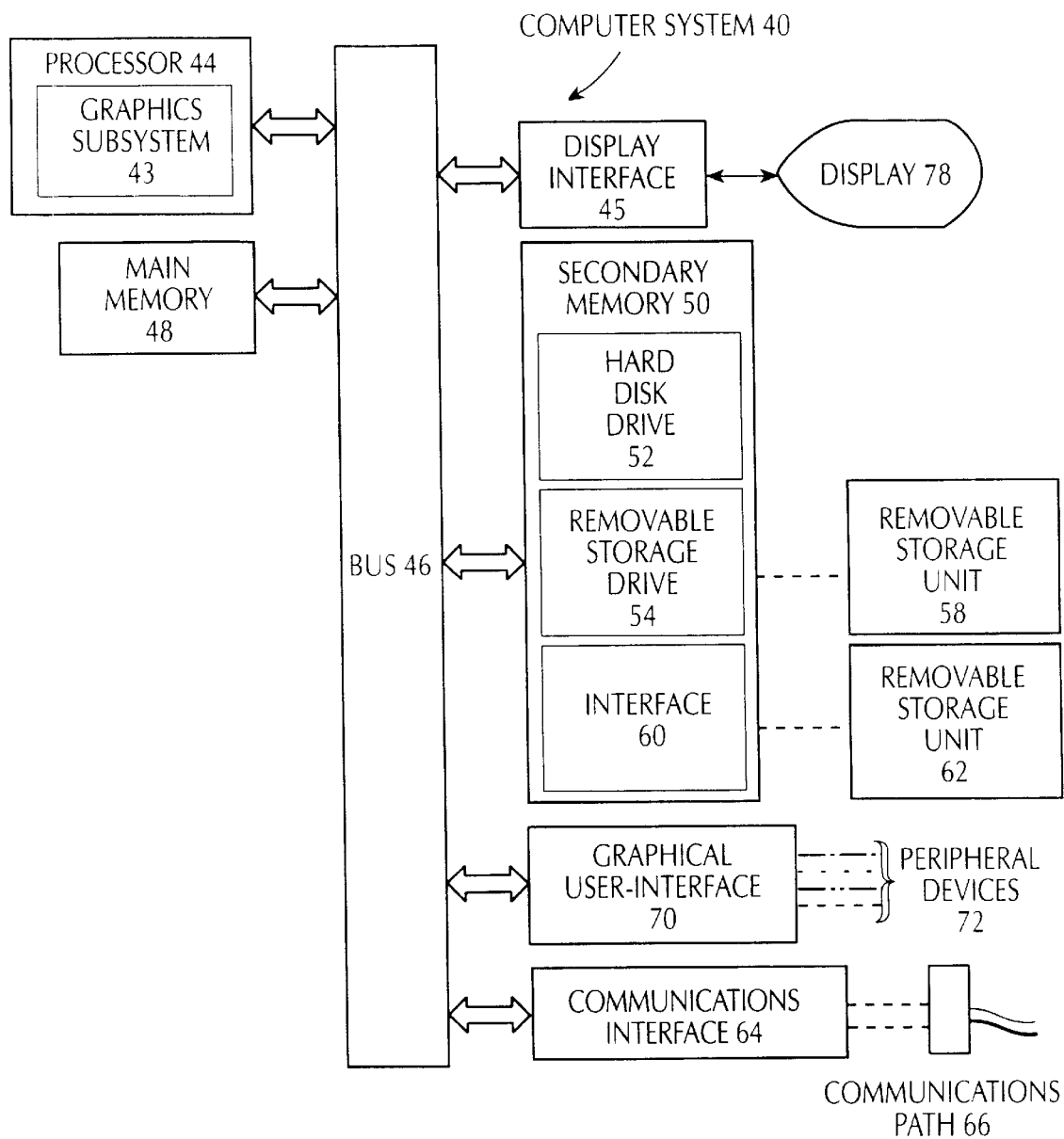
FIG. 8 is a block diagram showing a example computer hardware on which the present invention may be implemented.

FIG. 8 is a block diagram illustrating an example environment in which the present invention may be implemented. The environment is a computer system 40 that includes one or more processors, such as processor 44. Computer system 40 can comprise any type of general computer. The processor 44 is connected to a communications bus 46.

Computer system 40 includes a graphics subsystem 43. Although the graphics subsystem 43 can be included as part of processor 44, as shown in FIG. 8, it may implemented as a separate graphics engine or processor. Graphics data is output from the graphics subsystem 43 to the bus 46, and the display interface 45 forwards graphics data from the bus 46 for display on the display unit 78.

Computer system 40 also includes a main memory 48, preferably random access memory (RAM), and can also include a secondary data storage 50. The secondary storage 50 can include, for example, a hard disk drive 52 and/or a removable storage drive 54, such as a floppy disk drive, a magnetic tape drive, an optical disk drive, or the like. The removable storage drive 54 reads from and/or writes to a removable storage unit 58 in a manner well known to those in the computer arts. Removable storage unit 58 represents a floppy disk, magnetic tape, optical disk, or the like, which is read by and written to by removable storage drive 54. As will be appreciated, the removable storage unit 58 includes a computer usable storage medium having stored therein computer software and/or data.

In alternative embodiments, secondary data storage 50 may include other similar means for allowing computer programs or other instructions to be loaded into computer system 40. Such means can include, for example, a removable storage unit 62 and an interface 60. Examples can include CD-ROM, a program cartridge and cartridge interface (such as that found in video game devices), a removable memory chip (such as an EPROM, or PROM) and associated socket, and other removable storage units 62 and interfaces 60 which allow software and data to be transferred from the removable storage unit 62 to computer system 40.

Computer system 40 can also include a communications interface 64. Communications interface 64 allows software and data to be transferred between computer system 40 and external devices via communications path 66. Examples of communications interface 64 can include a modem, a network interface (such as Ethernet card), a communications port, or the like. Software and data transferred via communications interface 64 are in the form of signals which can be electronic, electromagnetic, optical or other signals capable of being received by communications interface 64, via communications path 66. Note that communications interface 64 provides a means by which computer system 40 can interface to a wide area network (WAN), such as the Internet.

Graphical user interface module 70 transfers user inputs from peripheral devices 72 to bus 46. These peripheral devices 72 can be a mouse, keyboard, touch screen, microphone, joystick, stylus, light pen, or the like. These devices enable a user to operate and control the data visualization tools of the present invention as described above.

The present invention is preferably implemented using software running in an environment similar to that described above with respect to FIG. 8. Computer programs are stored in main memory and/or secondary memory 50.

Computer programs can also be received via communications interface 64. Such computer programs, when executed, enable the computer system 40 to perform the features of the present invention as discussed herein. In particular, the computer programs, when executed, enable the processor 44 to perform the features of the present invention.

In an embodiment where the invention is implemented using software, the software may be stored in a computer program product and loaded into computer system 40 using removable storage drive 54, hard drive 52, or communications interface 64. Alternatively, the computer program product may be downloaded to computer system 40 over communications path 66. The control logic (software), when executed by the processor 44, causes the processor 44 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art.

The multidimensional database may comprise information available at one or more locations on a wide area network, such as the Internet. In that case, the computer system 40 may act as a client terminal, accessing the data items from the database by interaction with one or more server or host computers on the network. As discussed above, the software itself for performing the functionality of the present invention may also be downloaded to the computer system 40, possibly in the form of applets enabling the computer system 40 to access the functionality of the present invention executing on a server computer, may be downloaded and run on a browser running on the computer system 40.

The present invention has been described in terms of the illustrated hardware implementation for purposes of illustration only and is not limited in any way by the illustrated implementation. In fact, after reading the specification, it will become apparent to a person skilled in the relevant art how to implement the invention in alternative implementations.

While the present invention has been described in terms of preferred embodiments, the present invention is in no way limited to the described embodiments. It will be apparent to one of skill in the art, after having read the specification, that various changes in form and details may be made without departing from the scope of the invention, which is to be defined only in accordance with the appended claims.

What is claimed is:

1. A system for browsing multidimensional information, the system comprising:

a digital data storage circuit that stores the multidimensional information in a database;

a digital logic circuit operable to import, manipulate and output the multidimensional information in the database in accordance with a mapping model that maps each dimension of multidimensional information space to a location in abstract physical space; and a user interface that interactively accepts input from a user and, using the mapping model, renders a graphical representation of the multidimensional information space, wherein the graphical representation comprises one or more graphical sliding rods, each responsive to input of user-initiated restrictions on the multidimensional information space by effecting corresponding visible manifestations in the graphical sliding rod.

2. A system for browsing multidimensional information, the system comprising:

a digital data storage circuit that stores the multidimensional information in a database;

a digital logic circuit operable to import, manipulate and output the multidimensional information in the database in accordance with a mapping model that maps each dimension of multidimensional information space to a location in abstract physical space; and a user interface that interactively accepts input from a user and, using the mapping model, renders a graphical representation of the multidimensional information space, wherein the graphical representation is responsive to input of user-initiated restrictions on the multidimensional information space by effecting corresponding visible manifestations in the graphical representation, and wherein the multidimensional information space includes multidimensional information about plural items, the multidimensional information being structured to include a list of attributes, each attribute being associated with pointers pointing to values of that attribute, each value being associated with pointers pointing to those items from among the plural items having that value.

3. A system according to claim 2, wherein the graphical representation comprises one or more graphical sliding rods, each representative of one of the attributes.

4. A system according to claim 3, wherein for each graphical sliding rod, graphical representations of individual items are laid out in a first spatial dimension and graphical representations of corresponding values for each respective item are laid out in a second spatial dimension.

5. A system according to claim 3, wherein the user interface presents to the user a user-controllable visual dragging tool, the dragging tool effecting input of the user-initiated restrictions on the multidimensional information space by dragging along any of the sliding rods to highlight a desired one of the items, the dragging effecting a concomitant highlighting of the desired item in all others of the sliding rods.

6. A system according to claim 5, wherein the sliding rods are arranged in a parallel orientation and, upon highlighting of an item in any one sliding rod, the other sliding rods move so as to align all occurrences of the highlighted item in an orientation perpendicular to the parallel orientation.

7. A system according to claim 3, wherein the sliding rods are arranged in a starfish orientation.

8. A system according to claim 2, wherein the graphical representation comprises one or more parallel rows, each representative of one of the attributes for the plural items in the row.

9. A system according to claim 8, wherein a position along any of the one or more parallel rows corresponds uniquely to one of the items, and the user interface provides the user with a highlighter for highlighting a desired item in any row, the highlighting of a desired item effecting a concomitant highlighting of the desired item in all other rows.

10. A method for browsing multidimensional information in a database, the method for use on an apparatus having a digital logic circuit operable to import, manipulate and output the multidimensional information in the database, the method comprising:

(a) mapping each dimension of multidimensional information space to a location in abstract physical space; and (b) interactively accepting input from a user and, using the mapping, rendering a graphical representation of the multidimensional information space, wherein the graphical representation is responsive to input of user-initiated restrictions on the multidimensional information space by effecting corresponding visible manifestations in the graphical representation.

11. A method for browsing multidimensional information in a database, the method for use on an apparatus having a digital logic circuit operable to import, manipulate and output the multidimensional information in the database, the method comprising:

(a) mapping each dimension of multidimensional information space to a location in abstract physical space; and (b) interactively accepting input from a user and, using the mapping, rendering a graphical representation of the multidimensional information space, wherein the graphical representation is responsive to input of user-initiated restrictions on the multidimensional information space by effecting corresponding visible manifestations in the graphical representation, and wherein the multidimensional information space includes multidimensional information about plural items, the multidimensional information being structured to include a list of attributes, each attribute being associated with pointers pointing to values of that attribute, each value being associated with pointers pointing to those items from among the plural items having that value.

12. A method according to claim 11, wherein the graphical representation comprises one or more graphical sliding rods, each representative of one of the attributes.

13. A method according to claim 12, wherein for each graphical sliding rod, graphical representations of individual items are laid out in a first spatial dimension and graphical representations of corresponding values for each respective item are laid out in a second spatial dimension.

14. A method according to claim 12, wherein in step (b), the user is presented with a user-controllable visual dragging tool, the dragging tool effecting input of the user-initiated restrictions on the multidimensional information space by dragging along any of the sliding rods to highlight a desired one of the items, the dragging effecting a concomitant highlighting of the desired item in all others of the sliding rods.

15. A method according to claim 14, wherein the sliding rods are arranged in a parallel orientation, upon highlighting of an item in any one sliding rod, the other sliding rods move so as to align all occurrences of the highlighted item in an orientation perpendicular to the parallel orientation.

16. A method according to claim 12, wherein the sliding rods are arranged in a starfish orientation.

17. A method according to claim 11, wherein the graphical representation comprises one or more parallel rows, each representative of one of the attributes for the plural items in the row.

18. A method according to claim 17, wherein a position along any of the one or more parallel rows corresponds uniquely to one of the items, and the user is provided with a highlighter for highlighting a desired item in any row, the highlighting of a desired item effecting a concomitant highlighting of the desired item in all other rows.

19. An apparatus for browsing multidimensional information in a database, the apparatus comprising:

digital logic means for importing, manipulating and outputting the multidimensional information in the database in accordance with a mapping of each dimension of multidimensional information space to a location in abstract physical space; and user interface means for interactively accepting input from a user and, using the mapping, rendering a graphical representation of the multidimensional information space, wherein the graphical representation comprises one or more graphical sliding rods, each responsive to input of user-initiated restrictions on the multidimensional information space by effecting corresponding visible manifestations in the graphical sliding rod.

20. An apparatus for browsing multidimensional information in a database, the apparatus comprising:

digital logic means for importing, manipulating and outputting the multidimensional information in the database in accordance with a mapping of each dimension of multidimensional information space to a location in abstract physical space; and user interface means for interactively accepting input from a user and, using the mapping, rendering a graphical representation of the multidimensional information space, wherein the graphical representation is responsive to input of user-initiated restrictions on the multidimensional information space by effecting corresponding visible manifestations in the graphical representation, and wherein the multidimensional information space includes multidimensional information about plural items, the multidimensional information being structured to include a list of attributes, each attribute being associated with pointers pointing to values of that attribute, each value being associated with pointers pointing to those items from among the plural items having that value.

21. An apparatus according to claim 20, wherein the graphical representation comprises one or more graphical sliding rods, each representative of one of the attributes.

22. An apparatus according to claim 21, wherein for each graphical sliding rod, graphical representations of individual items are laid out in a first spatial dimension and graphical representations of corresponding values for each respective item are laid out in a second spatial dimension.

23. An apparatus according to claim 21, wherein the user interface means presents the user with a user-controllable visual dragging tool, the dragging tool effecting input of the user-initiated restrictions on the multidimensional information space by dragging along any of the sliding rods to highlight a desired one of the items, the dragging effecting a concomitant highlighting of the desired item in all others of the sliding rods.

24. An apparatus according to claim 23, wherein the sliding rods are arranged in a parallel orientation, upon highlighting of an item in any one sliding rod, the other sliding rods move so as to align all occurrences of the highlighted item in an orientation perpendicular to the parallel orientation.

25. An apparatus according to claim 21, wherein the sliding rods are arranged in a starfish orientation.

26. An apparatus according to claim 20, wherein the graphical representation comprises one or more parallel rows, each representative of one of the attributes for the plural items in the row.

27. An apparatus according to claim 26, wherein a position along any of the one or more parallel rows corresponds uniquely to one of the items, and the user is provided with a highlighter for highlighting a desired item in any row, the highlighting of a desired item effecting a concomitant highlighting of the desired item in all other rows.

28. A computer-readable medium storing code executable by a processor-controlled apparatus to perform a method for browsing multidimensional information in a database, the apparatus having a digital logic circuit operable to import, manipulate and output the multidimensional information in the database, the method comprising:

(a) a mapping each dimension of multidimensional information space to a location in abstract physical space; and (b) interactively accepting input from a user and, using the mapping, rendering a graphical representation of the multidimensional information space, wherein the graphical representation comprises one or more graphical sliding rods, each responsive to input of user-initiated restrictions on the multidimensional information space by effecting corresponding visible manifestations in the graphical sliding rod.

29. A computer-readable medium storing code executable by a processor-controlled apparatus to perform a method for browsing multidimensional information in a database, the apparatus having a digital logic circuit operable to import, manipulate and output the multidimensional information in the database, the method comprising:

(a) a mapping each dimension of multidimensional information space to a location in abstract physical space; and (b) interactively accepting input from a user and, using the mapping, rendering a graphical representation of the multidimensional information space, wherein the graphical representation is responsive to input of user-initiated restrictions on the multidimensional information space by effecting corresponding visible manifestations in the graphical representation, and wherein the multidimensional information space includes multidimensional information about plural items, the multidimensional information being structured to include a list of attributes, each attribute being associated with pointers pointing to values of that attribute, each value being associated with pointers pointing to those items from among the plural items having that value.

30. A computer-readable medium according to claim 29, wherein the graphical representation comprises one or more graphical sliding rods, each representative of one of the attributes.

31. A computer-readable medium according to claim 30, wherein for each graphical sliding rod, graphical representations of individual items are laid out in a first spatial dimension and graphical representations of corresponding values for each respective item are laid out in a second spatial dimension.

32. A computer-readable medium according to claim 30, wherein in step (b), the user is presented with a user-controllable visual dragging tool, the dragging tool effecting input of the user-initiate d restrictions on the multidimensional information space by dragging along any of the sliding rods to highlight a desired one of the items, the dragging effecting a concomitant highlighting of the desired item in all others of the sliding rods.

33. A computer-readable medium according to claim 32, wherein the sliding rods are arranged in a parallel orientation, upon highlighting of an item in any one sliding rod, the other sliding rods move so as to align all occurrences of the highlighted item in an orientation perpendicular to the parallel orientation.

34. A computer-readable medium according to claim 30, wherein the sliding rods are arranged in a starfish orientation.

35. A computer-readable medium according to claim 29, wherein the graphical representation comprises one or more parallel rows, each representative of one of the attributes for the plural items in the row.

36. A computer-readable medium according to claim 35, wherein a position along any of the one or more parallel rows corresponds uniquely to one of the items, and the user is provided with a highlighter for highlighting a desired item in any row, the highlighting of a desired item effecting a concomitant highlighting of the desired item in all other rows.

37. A system for browsing multidimensional information available on a network, the system comprising:
   a digital logic circuit operable to import from the network, manipulate and output to the network the multidimensional information in accordance with a mapping model that maps each dimension of multidimensional information space to a location in abstract physical space; and
   a user interface that interactively accepts input from a user and, using the mapping model, renders a graphical representation of the multidimensional information space,
      wherein the graphical representation comprises one or more graphical sliding rods, each responsive to input of user-initiated restrictions on the multidimensional information space by effecting corresponding visible manifestations in the graphical sliding rod.

38. A system for browsing multidimensional information available on a network, the system comprising:
   a digital logic circuit operable to import from the network, manipulate and output to the network the multidimensional information in accordance with a mapping model that maps each dimension of multidimensional information space to a location in abstract physical space; and
   a user interface that interactively accepts input from a user and, using the mapping model, renders a graphical representation of the multidimensional information space,
      wherein the graphical representation is responsive to input of user-initiated restrictions on the multidimensional information space by effecting corresponding visible manifestations in the graphical representation,
      and wherein the multidimensional information space includes multidimensional information about plural items, the multidimensional information being structured to include a list of attributes, each attribute being associated with pointers pointing to values of that attribute, each value being associated with pointers pointing to those items from among the plural items having that value.

39. A system according to claim 38, wherein the graphical representation comprises one or more graphical sliding rods, each representative of one of the attributes.

40. A system according to claim 39, wherein for each graphical sliding rod, graphical representations of individual items are laid out in a first spatial dimension and graphical representations of corresponding values for each respective item are laid out in a second spatial dimension.

41. A system according to claim 39, wherein the user interface presents to the user a user-controllable visual dragging tool, the dragging tool effecting input of the user-initiated restrictions on the multidimensional information space by dragging along any of the sliding rods to highlight a desired one of the items, the dragging effecting a concomitant highlighting of the desired item in all others of the sliding rods.

42. A system according to claim 41, wherein the sliding rods are arranged in a parallel orientation, upon highlighting of an item in any one sliding rod, the other sliding rods move so as to align all occurrences of the highlighted item in an orientation perpendicular to the parallel orientation.

43. A system according to claim 39, wherein the sliding rods are arranged in a starfish orientation.

44. A system according to claim 38, wherein the graphical representation comprises one or more parallel rows, each representative of one of the attributes for the plural items in the row.

45. A system according to claim 44, wherein a position along any of the one or more parallel rows corresponds uniquely to one of the items, and the user interface provides the user with a highlighter for highlighting a desired item in any row, the highlighting of a desired item effecting a concomitant highlighting of the desired item in all other rows.

46. A system for browsing multidimensional information available on the Internet, the system comprising:
   a digital logic circuit operable to import from the Internet, manipulate and output to the Internet the multidimensional information in accordance with a mapping model that maps each dimension of multidimensional information space to a location in abstract physical space; and
   a user interface that interactively accepts input from a user and, using the mapping model, renders a graphical representation of the multidimensional information space,
      wherein the graphical representation comprises one or more graphical sliding rods, each responsive to input of user-initiated restrictions on the multidimensional information space by effecting corresponding visible manifestations in the graphical sliding rod.

47. A system for browsing multidimensional information available on the Internet, the system comprising:
   a digital logic circuit operable to import from the Internet, manipulate and output to the Internet the multidimensional information in accordance a with mapping model that maps each dimension of multidimensional information space to a location in abstract physical space; and
   a user interface that interactively accepts input from a user and, using the mapping model, renders a graphical representation of the multidimensional information space, wherein the graphical representation is responsive to input of user-initiated restrictions on the multidimensional information space by effecting corresponding visible manifestations in the graphical representation, and wherein the multidimensional information space includes multidimensional information about plural items, the multidimensional information being structured to include a list of attributes, each attribute being associated with pointers pointing to values of that attribute, each value being associated with pointers pointing to values of that attribute, each value being associated with pointers pointing to those items from among the plural items having that value.

48. A system according to claim 47, wherein the graphical representation comprises one or more graphical sliding rods, each representative of one of the attributes.

49. A system according to claim 48, wherein for each graphical sliding rod, graphical representations of individual items are laid out in a first spatial dimension and graphical representations of corresponding values for each respective item are laid out in a second spatial dimension.

50. A system according to claim 48, wherein the user interface presents to the user a user-controllable visual dragging tool, the dragging tool effecting input of the user-initiated restrictions on the multidimensional information space by dragging along any of the sliding rods to highlight a desired one of the items, the dragging effecting a concomitant highlighting of the desired item in all others of the sliding rods.

51. A system according to claim 50, wherein the sliding rods are arranged in a parallel orientation, upon highlighting of an item in any one sliding rod, the other sliding rods move so as to align all occurrences of the highlighted item in an orientation perpendicular to the parallel orientation.

52. A system according to claim 48, wherein the sliding rods are arranged in a starfish orientation.

53. A system according to claim 47, wherein the graphical representation comprises one or more parallel rows, each representative of one of the attributes for the plural items in the row.

54. A system according to claim 53, wherein a position along any of the one or more parallel rows corresponds uniquely to one of the items, and the user interface provides the user with a highlighter for highlighting a desired item in any row, the highlighting of a desired item effecting a concomitant highlighting of the desired item in all other rows.

* * * * *